May 22, 1945.  H. P. SMITH  2,376,559
PLANTER
Filed Dec. 23, 1943  2 Sheets-Sheet 1
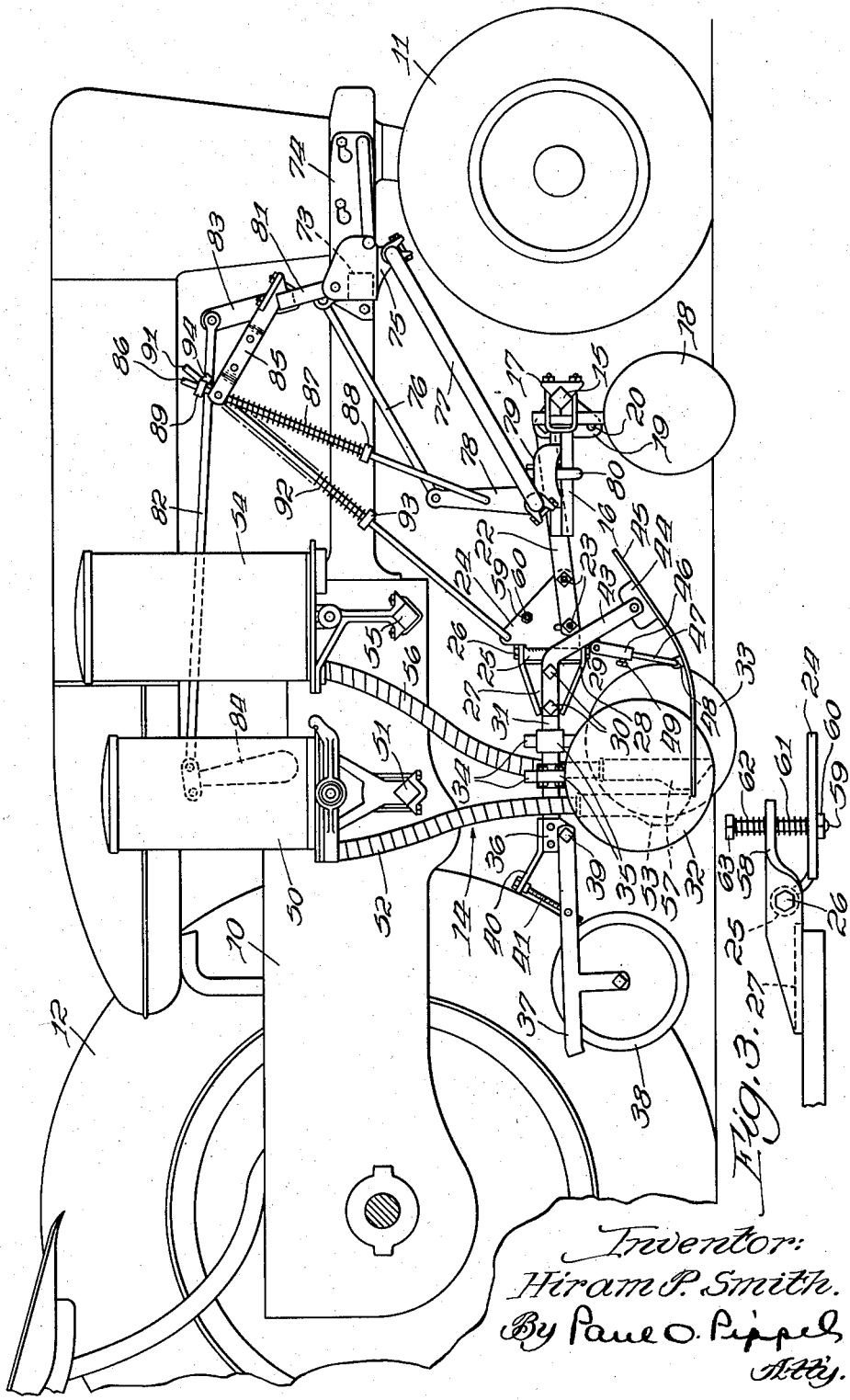
Inventor:
Hiram P. Smith.
By Paul O. Pippel
Atty.

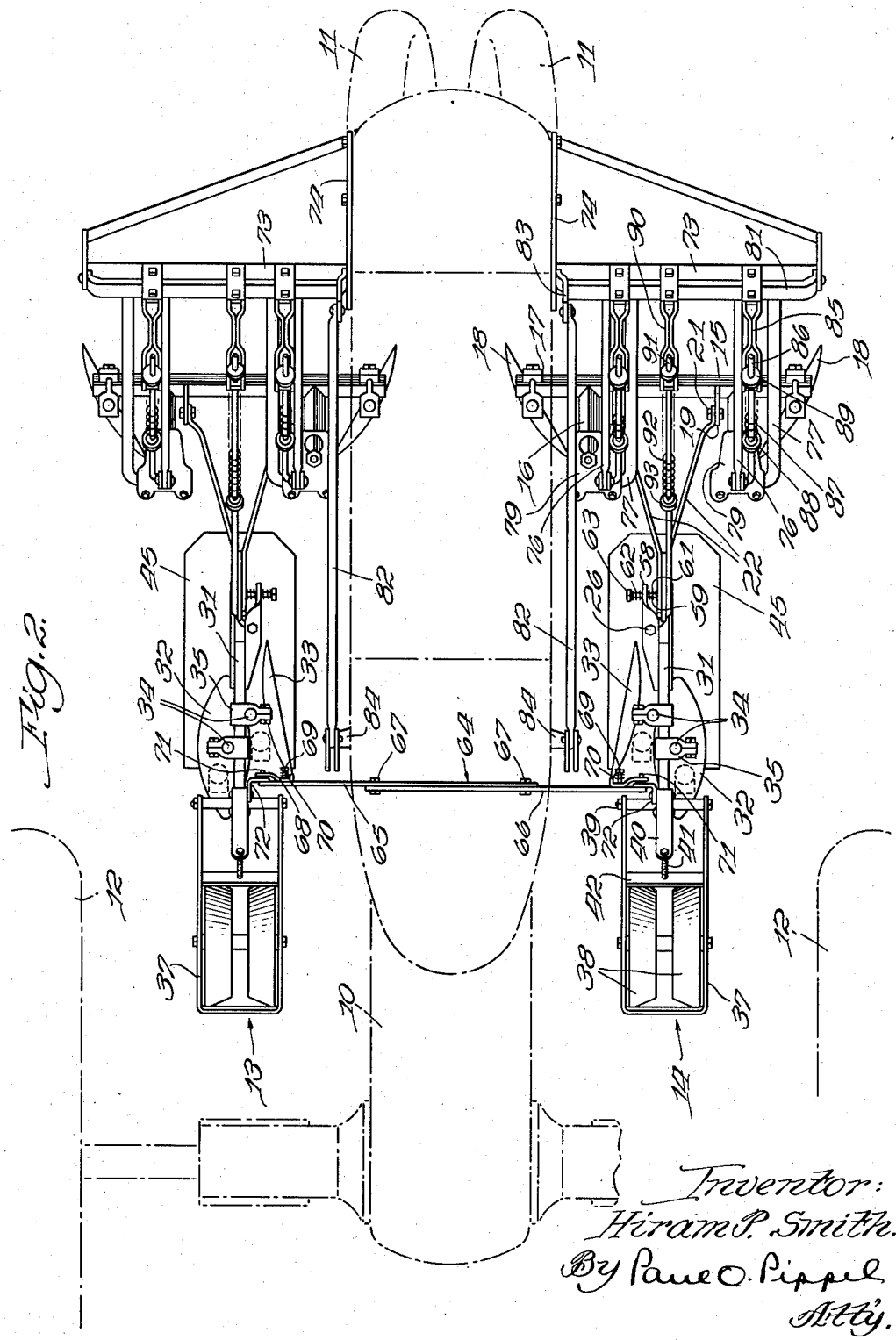

Patented May 22, 1945

2,376,559

UNITED STATES PATENT OFFICE 2,376,559

PLANTER

Hiram P. Smith, Canton, Ill., assignor to International Harvester Company, a corporation of New Jersey Application December 23, 1943, Serial No. 515,336

12 Claims. (Cl. 111—59)

This invention relates to agricultural implements and, more particularly, to planters.

Planters comprise generally a soil-working element such as a furrow- or bed-forming device, a seed dispenser, and a coverer mechanism in substantially longitudinal alinement. The dispensing mechanism likewise frequently includes a distributor for fertilizer and the like to be deposited near enough to the seed to be readily available as plant food, while not so near as to contact and injure the seed. To avoid the latter contingency, the seed and fertilizer boots are generally spaced some distance apart. This arrangement is particularly disadvantageous when planting on curving terrain, since in turning the planter, the seed and fertilizer lines may cross instead of occupying the desired constant parallel relation. This is particularly true of tractor-mounted planters of the type mentioned, since the turning radius of the tractor does not conform to the required relationship of parts. While the placement of the seed and fertilizer boots in the vicinity of the rear axle of the tractor would appear, from this point of view, to be desirable, easy supervision by the tractor operator of the planting operation is sacrificed. Another disadvantage encountered in tractor-mounted planters has been the failure of the dispensing mechanism to follow in the path laid down by the furrow- or bed-forming device. This device rides well in advance of the dispenser, and when the tractor is turned, the soil-preparing device turns first. The dispenser, being unable to follow immediately, is laterally displaced with respect to its proper position in the path. This means that when, for example, the soil-working tools are adapted to form a raised hill or bed in the center of which the seed is to be planted, the dispenser, when traveling on curving terrain, will be displaced from the seed bed, and the seed will be deposited at the side thereof. A two-fold result is that the material dispensed is deposited at ununiform depths and at points laterally removed from the path which it is desired to follow.

Therefore, an object of the present invention is the provision of an improved planter construction for attachment to a tractor or other support.

Another object is to provide in a tractor-mounted planter including a soil-working device and a material dispenser, means for causing the dispenser to follow in the path made by the soil-working device when planting on curving terrain.

A still further object is to provide in a planter wherein seed and fertilizer are deposited simultaneously, improved means for depositing the seed and fertilizer in close proximity with minimum danger of contact of the two materials.

Another object is to provide means permitting lateral displacement of the dispenser with respect to the soil-preparing device when the tractor is turned, and means for biasing the dispenser to alined relation with respect to the soil-preparing device.

These and other objects will become clear from the following detailed description when considered in conjunction with the accompanying drawings, wherein:

Figure 1 is a view in side elevation of a tractor with one rear wheel removed, showing the planter of the present invention mounted thereupon;

Figure 2 is a plan view of the mechanism shown in Figure 1; and

Figure 3 is a detail showing the pivotal connection between the dispenser and the soil-preparing device and the means by which these units are biased to alined relation.

Referring to the drawings, it will be observed that the planter of the present invention is mounted upon a tractor of the tricycle type having a longitudinally extending body portion 10, front wheels 11, and rear wheels 12. It will be noted in Figure 2 that two planter units 13 and 14, incorporating the features of the present invention, are mounted upon the tractor, one on each side of the body 10 thereof. Inasmuch as these units are substantial duplicates, a description of one will suffice for both, the two units being so mounted as to permit the planting of two rows simultaneously.

The planter of the present invention includes a transverse tool bar 15 having laterally spaced, rearwardly extending arms 16 affixed thereto and functioning in a manner to be hereinafter set forth. At each end of tool bar 15 are attached, by clamps 17, soil-preparing disks 18. These disks are of the concavo-convex type and, as shown in Figure 2, are so positioned as to form a hill or bed in which seed and fertilizer may be deposited. If desired, of course, these disks may be reversed so that a furrow is cut in which the seed and fertilizer may be deposited. Also affixed to tool bar 15 and extending rearwardly therefrom are laterally spaced plates 19 having vertically spaced openings 20 therein. Attached to these plates by bolts 21 are rearwardly extending pull straps 22 which converge rearwardly to provide for clamping therebetween, by means of longitudinally spaced bolts 23, a pivot plate 24. Integral with pivot plate 24 is a vertically extending sleeve 25 adapted for the reception of a pivot pin 26. Also pivoted upon pivot pin 26 is a pivot plate 27 provided with vertically spaced, forwardly projecting lugs 28, apertured to receive the pivot pin 26, held in place by a nut 29.

Affixed to plate 27 by bolts 30 is a longitudinally extending beam 31. Laterally spaced furrow opener disks 32 and 33 mounted upon standards 34 are attached to the beam 31 by clamps 35. Rearwardly of disks 32 and 33 a bracket 36 is attached to beam 31 and has affixed thereto a rearwardly extending coverer frame 37, in which are mounted coverer wheels 38. Frame 37 is pivoted upon a transversely extending bolt 39 for pivotal movement, and adjustment of the position of the wheels 38 is effected by a threaded bolt 41 passed through an aperture in a rearwardly projecting arm 40 of bracket 36 and through a threaded opening in a brace member 42 for coverer frame 37. Also attached to beam 31 by the bolts 30 is a downwardly extending strap 43, the lower end of which is pivoted upon an upstanding bracket 44 affixed to a gauge shoe 45 having a rearwardly bent portion adapted to ride upon the surface of the ground and gauge planting depth. The gauge shoe may be adjusted by a mechanism comprising a sleeve 46 pivoted upon the strap 43 and having inserted therein a shaft 47 pivoted upon a lug 48 fast on the gauge shoe 45. Shaft 47 is held in adjusted position with respect to sleeve 46 by a set screw 49.

With particular reference to Figure 1, it will be noted that opener disks 32 and 33 are offset longitudinally and vertically; that is, disk 33 extends approximately two inches in advance of and below disk 32. Thus, it will be clear that in passing through the soil, disk 33 will cut a deeper furrow than will disk 32. Seed is deposited in the furrow formed by disk 32 and is directed thereto from a seed can 50 mounted upon a transverse bar 51 affixed to the tractor body. Seed from can 50 passes through a flexible tube 52 to a seed boot 53 adjacent the inner surface of disk 32. Fertilizer is dispensed from a can 54 mounted upon a laterally extending bar 55 affixed to the side of the tractor. Fertilizer is passed to the furrow, formed by disk 33, through a flexible tube 56 and a fertilizer boot 57 adjacent the inner surface of disk 33. Thus, due to the lateral spacing of disks 32 and 33 and the offset positions thereof, the seed and fertilizer are deposited in close proximity and yet sufficiently separated by a wall of earth to prevent crossing of seed and fertilizer lines and consequent injury to the seed.

It should now be clear that the planter unit of the present invention comprises a longitudinally extending frame having a soil-preparing tool mounted upon the forward portion thereof and a material-dispensing unit mounted upon the rearward portion thereof, and that the rear portion of the frame is pivoted for lateral swinging movement with respect to the forward portion thereof upon the pivot pin 26. Therefore, the material-dispensing unit has lateral swinging movement with respect to the soil-preparing unit to permit the dispenser unit to follow in the path formed by the soil-preparing unit, particularly when operating upon curving terrain. In order to provide for return of the laterally swinging rearward portion of the frame to alined relation with the forward portion thereof, upper lug 28 on pivot plate 27 is provided with an extension 58 apertured at its end to receive a transverse bolt 59 passing through forward pivot plate 24 and held against displacement therefrom by a nut 60. The portion of bolt 59 between plate 24 and extension 58 is surrounded by a pressure spring 61 exerting pressure to return the rearward portion of the planter frame to longitudinal alinement with the forward portion thereof upon lateral swinging movement thereof to the left, as viewed in Figure 2. The portion of bolt 59 projecting from the other side of extension 58 is surrounded by a spring 62 abutting against a nut 63. This spring functions to urge the rearward portion of the frame back into alinement when it is swung laterally to the right, as viewed in Figure 2.

It should be clear that under normal operating conditions, due to the vertically and longitudinally offset positions of disks 32 and 33, a certain amount of pressure will be exerted against the unit to urge it in the direction of the tractor body. In order to offset this tendency, the units 13 and 14 on each side of the tractor are connected by a brace 64 comprising a pair of elements 65 and 66 extensibly joined by bolts 67. Elements 65 and 66 are each provided at their respective ends with a strap 68, apertured to receive for sliding movement a bolt 69, surrounded by a spring 70 adapted to urge the strap against the element but to permit separation thereof under stress. Strap 68 is spaced from element 65 at its end and is apertured to receive a pin 71 mounted in a bracket 72, affixed to the rearward portion of beam 31. It will thus be noted that the rear portion of planter units 13 and 14 are so connected to the forward portions thereof as to swing laterally with respect thereto and are connected together for simultaneous swinging movement by the brace 64. It will also be observed that the placement of the disks 32 and 33 in units 13 and 14 is such that lateral thrust against the planter units is in the direction of the tractor body, so that thrust against one unit is offset by thrust against the other unit.

Each unit 13 and 14 is adapted to be vertically moved with respect to the tractor to and from ground-working position by a mechanism including a laterally extending bar 73 affixed to opposite sides of the forward portion of the tractor body by plates 74 and having brackets 75 attached thereto supporting rearwardly extending, vertically spaced parallel links 76 and 77. The rearward ends of links 76 and 77 are pivoted upon an upstanding bracket 78 having a right-angled base portion 79 secured to bar 16 by a U-bolt 80. Lifting of the planter is accomplished through the intermediary of a bail 81 rocked by a rod 82 connected at one end to an arm 83 on the bail 81 and at its other end to a rock arm 84 rocked by a suitable power lift mechanism, not shown. Bail 81 is provided with a rearwardly and upwardly extending arm 85 supporting for sliding movement at the end thereof a rod 86 connected at its lower end to the bracket 78 surrounded by a spring 87 abutting against a collar 88 keyed to the rod. The upper end of rod 86 is provided with a collar 89 adapted to abut against the outer end of arm 85 when the planter is lifted. Likewise attached to bail 81 is an arm 90 supporting for sliding movement at the end thereof a rod 91, the lower end of which is pivotally connected to the forward pivot plate 24 of the planter unit. This rod is likewise surrounded by a spring 92 abutting against a collar 93 keyed to the rod. Another collar 94 at the upper end of the rod is adapted to abut against the outer end of arm 90 when the planter is lifted.

As stated before, the disks 18 by reversal thereof may function as a hill-forming or a furrow-forming device. In order to compensate for this change in function, vertical adjustment must be made of the opener disks 32 and 33 and the coverer frame 37 with respect to the soil-preparing tools 18. For this purpose, one of the bolts 23, by which pull straps 22 are connected to plate 24, is inserted in a slot 95 in the plate 24, and the forward end of each pull strap is adapted to be attached to the plate 19 at either of the vertically spaced openings 20 therein. Thus, while the adjustment of the connection of pull straps 22 to plate 19 effects major adjustments in the relative position of tools 18 with respect to the disks 32 and 33, the slot 95 in plate 24 functions to effect minor adjustments therein.

It should now be clear that a novel planter mechanism has been devised for attachment to a tractor, wherein means are provided for permitting lateral movement of the dispensing mechanism with respect to the soil-preparing mechanism, including means for urging these mechanisms to longitudinal alinement. Likewise, where two or more such planters are mounted upon a tractor for the planting of more than one row, provision is made for connecting the planters so that they move in unison.

Having now described the invention, it should be understood that modifications may be made therein without departing from the spirit of the invention or the scope of the appended claims.

What is claimed is:

1. In combination with a tractor, a planter including longitudinally alined forward and rearward frame portions, means on the tractor for vertically moving the planter to and from working position, hinge means connecting said rearward portion to said forward portion for free lateral swinging movement, and means associated with said forward portion for adjusting the relative vertical positions of said frame portions.

2. In combination with a tractor, a planter including longitudinally alined forward and rearward frame portions, means on the tractor for vertically moving the planter to and from working position, hinge means connecting said rearward portion to said forward portion for free lateral swinging movement, means associated with said forward portion for adjusting the relative vertical positions of said frame portions, and means biasing said portions to alined position.

3. In combination with a tractor, a planter including longitudinally alined forward and rearward frame portions, means on the tractor for vertically moving the planter to and from working position, hinge means connecting said rearward portion to said forward portion for free lateral swinging movement, means associated with said forward portion for adjusting the relative vertical positions of said frame portions, and spring means associated with said hinge means for urging said portions to alined position.

4. In combination with a tractor, a planter comprising a longitudinally extending frame, soil-preparing tools on the forward portion of said frame, laterally spaced furrow opener disks on the rearward portion of said frame arranged to follow in the path of said soil-preparing tools, the lower and forward edges of one said disk being respectively below and in advance of the corresponding edges of the other said disk for cutting spaced furrows of different depths, means associated with each said disk for depositing material in the furrows cut thereby, hinge means connecting the rearward portion of said frame to the forward portion for free lateral swinging movement with respect thereto, and spring means biasing said frame portions to alined relation.

5. In a multiple-row planter, a traveling support, laterally spaced planter frames attached to the support, means hingedly connecting each said frame to said support for lateral swinging movement with respect thereto, a pair of laterally spaced furrow opener disks attached to each said frame, the disks in each pair being so positioned and arranged as to receive side thrust in opposite directions when in operating position, and means connecting said frames, whereby side thrust in one direction against one pair of disks is counteracted by side thrust in the opposite direction against the other pair of disks.

6. In combination with a tractor, laterally spaced planter units mounted on the tractor for vertical movement to and from planting position, each said planter unit including means for depositing material in a previously formed path, means for pivotally mounting said material depositing means for lateral pivotal movement, means imposing a resistance to pivoting of said material depositing means, and means connecting said spaced material depositing means to prevent relative lateral movement thereof.

7. In combination with a tractor, laterally spaced planter units mounted on the tractor for vertical movement to and from planting position, each said planter unit including soil-preparing means and means for depositing material in the path of said soil-preparing means, means connecting said material-depositing means to said soil-preparing means for lateral swinging movement with respect thereto, means imposing a resistance to pivoting of said material depositing means, and means connecting said spaced material depositing means to prevent relative lateral movement thereof.

8. In combination with a tractor having dirigible front wheels and rear drive wheels, laterally spaced planter units mounted on said tractor for vertical movement to and from operating position, each said unit including soil-preparing tools and a set of laterally spaced furrow opener disks arranged to follow in the path of said soil-working tools, means permitting lateral swinging movement of said sets of furrow opener disks with respect to said soil-preparing tools, the disks in each set being arranged to cut furrows of different depths and to receive side thrust in opposite directions, and means connecting said sets of disks to prevent relative lateral movement thereof.

9. The combination with a tractor having dirigible front wheels and rear drive wheels, of a planter comprising a pair of longitudinally extending planter units, one at each side of the tractor body between the front and rear wheels thereof, soil-preparing tools on the forward portion of each said unit, material-depositing tools on the rear portion of each said unit, hinge means connecting the rear portion of each unit to the forward portion thereof for lateral swinging movement, means connecting the rear portions of said frames to prevent relative lateral movement thereof, means imposing a resistance to lateral swinging of said rear portions, and means on the tractor connected to the forward portion of each said unit for effecting vertical movement thereof.

10. The combination with a tractor having dirigible front wheels and rear drive wheels, of a planter comprising a pair of longitudinally extending planter units, one at each side of the tractor body between the front and rear wheels thereof, soil-preparing tools on the forward portion of each said unit, material-depositing tools on the rear portion of each said unit, hinge means connecting the rear portion of each unit to the forward portion thereof for lateral swinging movement, means connecting the rear portions of said frames to prevent relative lateral movement thereof, means imposing a resistance to lateral swinging of said rear portions, means on the tractor connected to the forward portion of each said unit for effecting vertical movement thereof, and dispensing means mounted on the tractor body arranged to deliver material to said material-depositing tools.

11. The combination with a tractor having dirigible front wheels and rear drive wheels, of a self-contained planter unit comprising a longitudinally extending frame having forward and rearward tool-attaching portions, said forward portion including transversely extending frame elements, lift means on the tractor connected to said elements for moving said unit to and from working position, working tools on the forward portion of said frame, working tools on the rearward portion of said frame, means hingedly connecting said rearward portion to said forward portion for lateral swinging movement in response to side thrust thereupon, and resilient means imposing a resistance to such lateral swinging movement.

12. The combination with a tractor having dirigible front wheels and rear drive wheels, of a self-contained planter unit mounted at the side of the tractor body and between front and rear wheels thereof, said unit comprising a frame having forward and rearward tool-attaching portions, lift means on the tractor connected to said forward portion for moving the entire unit to and from working position, soil-preparing tools on said forward portion, material-depositing tools on said rearward portion, means hingedly connecting said rearward portion to said forward portion for lateral swinging movement in response to side thrust thereupon, resilient means imposing a resistance to such lateral swinging movement, material-dispensing means mounted on the tractor, and means for delivering material from said dispensing means to said material-depositing tools in any position of lateral swinging movement thereof.

HIRAM P. SMITH.